(No Model.) 2 Sheets—Sheet 1.
U. G. DETWILER.
COUPLING RELEASING MECHANISM.
No. 603,839. Patented May 10, 1898.
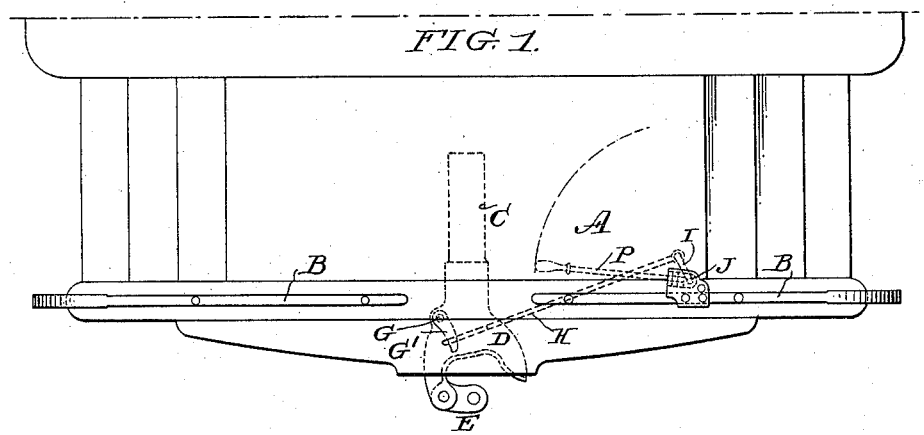
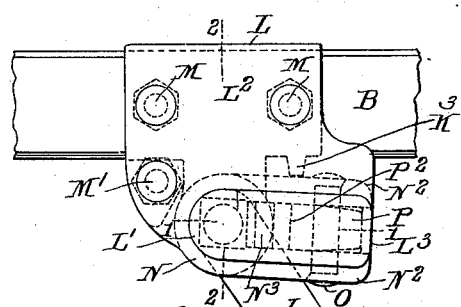
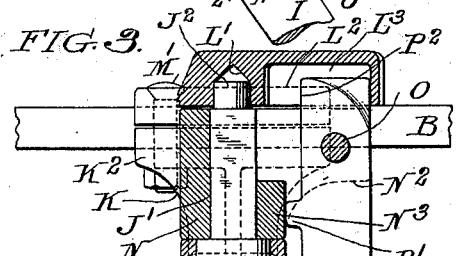
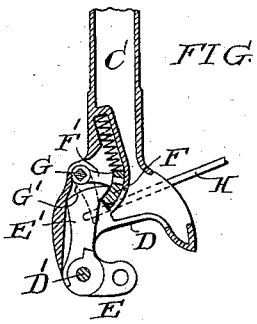
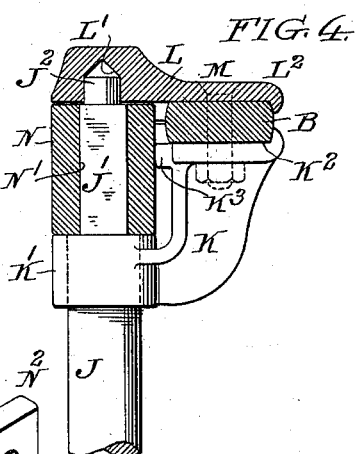
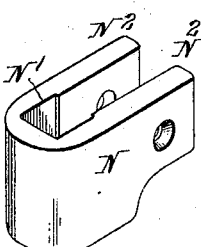
WITNESSES:
INVENTOR:

(No Model.) 2 Sheets—Sheet 2.
U. G. DETWILER.
COUPLING RELEASING MECHANISM.
No. 603,839. Patented May 10, 1898.
FIG. 7. FIG. 8. FIG. 9.
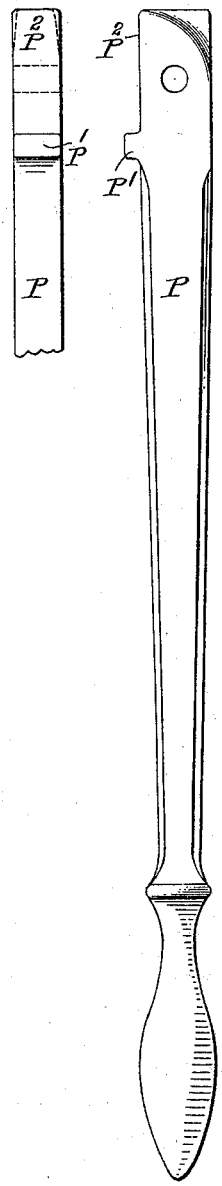
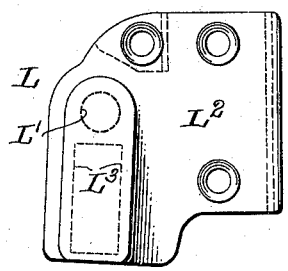
FIG. 11. FIG. 10.
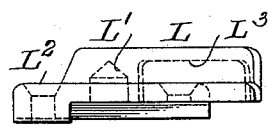
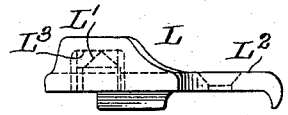
FIG. 12.
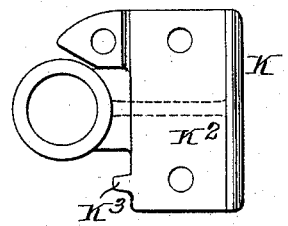
FIG. 14. FIG. 13.
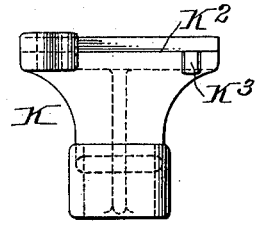
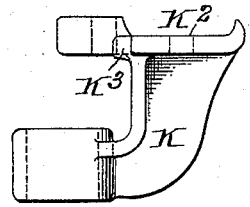
FIG. 15.
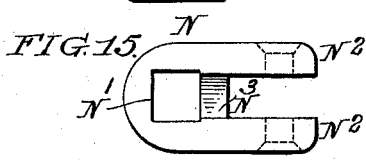
WITNESSES: FIG. 16. INVENTOR:
Ulysses G. Detwiler
by his atty.
Francis T. Chambers

UNITED STATES PATENT OFFICE.

ULYSSES G. DETWILER, OF ALTOONA, PENNSYLVANIA.

COUPLING-RELEASING MECHANISM.

SPECIFICATION forming part of Letters Patent No. 603,839, dated May 10, 1898.

Application filed January 26, 1898. Serial No. 667,989. (No model.)

*To all whom it may concern:*

Be it known that I, ULYSSES G. DETWILER, a citizen of the United States of America, residing in Altoona, in the county of Blair, in the State of Pennsylvania, have invented a certain new and useful Improvement in Coupler-Releasing Mechanism, of which the following is a true and exact description, reference being had to the accompanying drawings, which form a part thereof.

My invention relates to releasing mechanism adapted for use on platform-cars and in connection with the well-known Janney or Master Car-Builders' type of car-couplers, my object being to provide a releasing mechanism at once strong and durable, of particular adaptability to passenger-cars, and of a construction which practically insures the return of the actuating-lever to its normal position after use.

The nature of my improvements will be best understood as described in connection with the drawings, in which they are illustrated, and in which—

Figure 1 is a plan view of a car-platform, showing the coupler and releasing mechanism as arranged in connection with the hand-rail of the platform. Fig. 2 is a plan view showing the releasing mechanism on and immediately below the hand-rail. Fig. 3 is an elevation, partially taken on the line 1 1 of Fig. 2, showing the same mechanism shown in plan in Fig. 2 and also the crank-arm at the bottom of the vertical shaft. Fig. 4 is an elevation, partly on the section-line 2 2 of Fig. 2. Fig. 5 is a perspective view of a yoke-piece used in connection with my construction. Fig. 6 is a sectional plan view of the coupler. Fig. 7 is a front view of the upper part of the release-lever; Fig. 8, a side view of the whole release-lever. Fig. 9 is a plan view of the top or upper bracket used in connection with my construction; Fig. 10, an end view of said bracket; Fig. 11, a side view of said bracket. Fig. 12 is a plan view of the lower bracket; Fig. 13, an end view thereof; Fig. 14, a side view thereof. Fig. 15 is a plan view of the yoke-piece shown in perspective in Fig. 5, and Fig. 16 is a side elevation of said yoke-piece.

A indicates the platform of the car; B B, the hand-rails of said platform.

C is the draw-bar of the coupler, D the coupler-head, and E the movable jaw of the coupler, which, as shown, (see Fig. 6,) is one arm of a bell-crank lever E E', pivoted to the head D' and normally held in closed or coupling position by a locking-block F, secured to the end of an arm F', pivoted to the head D' and shaft G, a spring being employed, as shown, to hold the locking-block in position. To the pivotal shaft G is also attached a lever-arm G', which, by means of a connecting-rod H, is coupled to the end of a lever-arm I, (see Figs. 1 and 3,) formed on or attached to the vertical shaft J, which extends up from the platform of the car and has an upper bearing secured upon the hand-rail.

All of the above-described features are old and in common use and are shown here simply as a type of the apparatus in connection with which my invention is designed for use, and obviously, as will be seen, my devices are adapted for use with any mechanism of a generally similar type.

I form the upper end of the shaft J with an angular, preferably squared, section J', as shown, the extreme upper end being preferably turned down to a circular section, as indicated at $J^2$.

K is a bearing-bracket, the bearing portion K' of which fits around the shaft J below the squared portion J', while the upper end of the bracket is, as indicated at $K^2$, adapted to fit on the under side of the hand-rail B, to which it can be attached in any convenient way, preferably by means of bolts M. This bracket K is also provided with a stop-lug $K^3$, the function of which will hereinafter be described.

L is the upper or covering bracket, preferably also constituting a supplemental bearing for the top of the shaft J, as indicated at L', this top bracket having also a portion $L^2$, adapted to fit on the top of the hand-rail B and an extension formed with a cavity, as indicated at $L^3$, the function of which will be described. The two brackets are secured to the hand-rail by the bolts M and may further be advantageously secured together by a bolt M', as indicated in Figs. 2 and 3.

N is a yoke-piece having a square section N', which fits upon the square section J' of the shaft J, and two parallel laterally-extending arms $N^2 N^2$, pierced with holes, as shown, for a pivoted pin O, a cross-bar N³ being provided, as shown, and arranged to serve as a stop to limit the motions in both directions of the pivot of the pivoted lever P, which is pivoted to the arms of the yoke-piece on the pin O, provided with a stop-lug P', which when the lever is turned down rests against the cross-bar N³, and with a nose P², which when the lever is turned down projects up into the cavity L³ of the top bracket and when the lever is turned up rests against the top of the cross-bar N³.

The normal position of the parts is that shown in Figs. 1, 2, 3, and 4, the yoke-piece being turned in toward the hand-rail until it rests against the stop-lug K³, this lug being placed, preferably, so that the hand-lever P will when turned up, as shown in Fig. 1, project slightly inside of the hand-rail, so as to be easily grasped by the hand of the brakeman in its normal position. The lever P being turned down its nose P² extends up into the cavity L³ and is not only covered from sight and from possible contact with the clothing of passengers, but it is locked in position by said cavity, so that no accidental turning of the shaft J can occur. When it is desired to release the coupling-nose, the lever is first turned up to the position indicated in dotted lines in Fig. 1, the nose P² of the lever turning down out of the cavity L³ and coming in contact with the cross-bar N³. The brakeman then pulls the lever, as indicated by the curved dotted line in Fig. 1, swinging it across the platform and turning the shaft J, which, through the connecting mechanism described, acts upon the locking-block F and releases the nose E of the coupler. As soon as the turning action begins the nose or upper end of the lever P passes out of line with the cavity L³ and is engaged by the under side of the top bracket, so that it cannot be turned down or out of a substantially horizontal position, and in order to turn it down again it is necessary to first push it back to position, (shown in dotted lines in Fig. 1,) when the nose P² will register with the cavity L³ and permit the lever to be turned down, as shown in Fig. 3.

Having now described my invention, what I claim as new, and desire to secure by Letters Patent, is—

1. In a coupler-releasing mechanism, substantially as specified, the combination with a vertical rock-shaft, as J, and a rail, as B, of a car-platform, of a bracket or brackets secured to the rail and forming a top bearing for the shaft, a yoke-piece as N extending out from the shaft below the top bracket, a lever as P, pivotally secured to said yoke-piece so as to be movable from a position substantially parallel to the shaft to one substantially perpendicular thereto, and an extension of the top bracket arranged to cover the end of said lever.

2. In a coupler-releasing mechanism, substantially as specified, the combination with a vertical rock-shaft, as J, and a rail, as B, of a car-platform, of a bracket or brackets secured to the rail and forming a top bearing for the shaft, a yoke-piece as N extending out from the shaft below the top bracket, a lever as P, pivotally secured to said yoke-piece so as to be movable from a position substantially parallel to the shaft to one substantially perpendicular thereto, and an extension of the top bracket having a cavity L³ formed in it and arranged as described to permit the lever to swing on its pivot in one position of the shaft only.

3. In a coupler-releasing mechanism, substantially as specified, the combination with a vertical rock-shaft as J and a rail, as B, of a car-platform, of a bracket K secured on the under side of the rail and forming a bearing for the upper end of the shaft, a yoke-piece N secured to the shaft above said bearing, a lever P pivotally secured to said yoke-piece so as to turn from a position substantially parallel to the shaft to one perpendicular thereto, and a bracket L secured to the top of the rail so as to extend over the top of the shaft and over the yoke-piece extending out therefrom, said bracket L having a cavity L³ formed in it to receive the upper end of the lever and permit it to turn down in and only in one position of the shaft.

4. In a coupler-releasing mechanism, substantially as specified, the combination with a vertical rock-shaft, as J, and a rail, as B, of a car-platform, of a bracket K, secured on the under side of the rail and forming a bearing for the upper end of the shaft, said bracket having a stop-lug K³ arranged to stop the motion of the yoke-piece as described, a yoke-piece N secured to the shaft above said bearing, a lever P pivotally secured to said yoke-piece so as to turn from a position substantially parallel to the shaft to one perpendicular thereto, and a bracket L secured to the top of the rail so as to extend over the top of the shaft and over the yoke-piece extending out therefrom, said bracket L having a cavity L³ formed in it to receive the upper end of the lever and permit it to turn down in and only in one position of the shaft.

ULYSSES G. DETWILER.

Witnesses:
N. J. YERGY,
W. J. HAMOR.